(12) United States Patent
Sawada et al.

(10) Patent No.: US 7,079,929 B2
(45) Date of Patent: Jul. 18, 2006

(54) VEHICLE POWER STEERING APPARATUS CAPABLE OF SUPPRESSING VIBRATION OF EPS MOTOR DURING CHANGES IN STEERING ANGLE

(75) Inventors: Mamoru Sawada, Yokkaichi (JP);
Toshiki Matsumoto, Kariya (JP);
Tsutomu Tashiro, Nagoya (JP);
Mamoru Mabuchi, Kariya (JP);
Takehito Fujii, Anjo (JP); Motoaki Kataoka, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/889,077

(22) Filed: Jul. 13, 2004

(65) Prior Publication Data
US 2005/0027417 A1    Feb. 3, 2005

(30) Foreign Application Priority Data
Jul. 30, 2003    (JP) ............... 2003-282872

(51) Int. Cl.
*B62D 5/04*    (2006.01)
*B62D 6/00*    (2006.01)

(52) U.S. Cl. .................. 701/41; 701/43; 180/443

(58) Field of Classification Search .............. 701/41, 701/42, 36, 43; 180/443, 446, 400, 412, 180/413, 6.2, 6.24; 318/432, 433, 798, 140
See application file for complete search history.

(56) References Cited

U.S. PATENT DOCUMENTS

| | | | |
|---|---|---|---|
| 4,664,211 A | 5/1987 | Oshita et al. | |
| 4,966,261 A | 10/1990 | Kohno et al. | |
| 5,448,482 A * | 9/1995 | Yamamoto et al. | 701/41 |
| 6,107,767 A * | 8/2000 | Lu et al. | 318/561 |
| 6,122,579 A | 9/2000 | Collier-Hallman et al. | |
| 6,131,693 A * | 10/2000 | Mukai et al. | 180/446 |
| 6,161,068 A * | 12/2000 | Kurishige et al. | 701/41 |
| 6,407,524 B1 * | 6/2002 | Endo et al. | 318/432 |
| 6,498,451 B1 * | 12/2002 | Boules et al. | 318/661 |

FOREIGN PATENT DOCUMENTS

| | | |
|---|---|---|
| EP | 1 308 368 | 5/2003 |
| JP | 58-152131 | 9/1983 |
| JP | 61-132465 | 6/1986 |
| JP | 2-66360 | 3/1990 |
| JP | 4-121421 | 4/1992 |
| JP | 8-207804 | 8/1996 |
| JP | 8-276760 | 10/1996 |
| JP | 11-59469 | 3/1999 |
| JP | 2001-151123 | 6/2001 |
| WO | WO 03/076251 | 9/2003 |

* cited by examiner

*Primary Examiner*—Dalena Tran
(74) *Attorney, Agent, or Firm*—Posz Law Group, PLC

(57) ABSTRACT

In a power steering apparatus employing an EPS (electrical power steering) motor coupled to a steering mechanism, when vibration of the steering mechanism is produced by twisting of tire rubber due to changes in steering angle, resultant pulsation of the drive current of the EPS motor are suppressed by adding to the drive current a current that is of equal frequency and opposite phase to the pulsation. Vibration of the EPS motor shaft, and resultant vibration of the steering wheel and vehicle body, are thereby effectively suppressed.

7 Claims, 5 Drawing Sheets

VEHICLE POWER STEERING APPARATUS CAPABLE OF SUPPRESSING VIBRATION OF EPS MOTOR DURING CHANGES IN STEERING ANGLE

BACKGROUND OF INVENTION

1. Field of Application

The present invention relates to a power steering apparatus for a vehicle, which suppresses vehicle vibration that may occur due to lateral forces acting on tires of the vehicle while the steering direction of the corresponding vehicle wheels is being changed.

2. Description of Prior Art

With a typical power steering apparatus, a signal (referred to in the following as the steering signal) is generated in accordance with the degree to which the steering wheel is being actuated by the vehicle driver, e.g., based on sensing the amount and direction of torque that is being applied to the steering column by the driver. The steering signal is produced from a power steering ECU (Electronic Control Unit), and an EPS (Electrical Power Steering) motor is driven based on that signal, to apply a supplementary amount of torque to a steering mechanism linked to the front wheels, such that the angle of the front wheels is adjusted appropriately. Such a system is described in Japanese Patent No. 2568817 (corresponding to U.S. Pat. No. 4,664,211) for example.

With such a system, when the steering angle of the front wheels is changed so that the vehicle begins to attempt to turn, lateral forces are thereby applied to each of the tires of the front wheels, causing twisting of the rubber of the tires to occur, which may produce vibration. This vibration is transmitted through the steering mechanism to the shaft of the EPS motor, and can result in angular shaking of the rotor of the EPS motor. This can result in electric power being generated by the EPS motor, with a generated voltage being produced which is of inverse direction to the drive voltage of the motor. This phenomenon occurs repetitively, causing pulsation in the effective drive current of the EPS motor, with resulting vibration of the EPS motor, which causes noise to be produced by the EPS motor. In addition, the vibration may result in resonant vibration of the vehicle body and the steering wheel, causing sensations of discomfort to the driver. Furthermore, this phenomenon results in instability of the reaction forces between the tires and the road surface, so that there is a lowering of stability of vehicle motion.

As an attempt to overcome this problem, a system has been proposed whereby the steering shaft is divided into a first steering column that is connected to the steering wheel and a second steering column that is connected to the lower end of the first steering column via a flexible member. That is to say, a mechanical arrangement is used to attempt to reduce the amount of vibration of the steering wheel. This system is described for example in Japanese Patent Laid-open No. 2001-151123.

However with the latter prior art method, there is no reduction achieved in vibration of the EPS motor. Hence, there will be no lowering of the vibration noise that is produced by the EPS motor, so that there will be no reduction of the degree of driver discomfort which results from the transfer of vibration to the body of the vehicle from the EPS motor.

SUMMARY OF THE INVENTION

It is an objective of the present invention to overcome the above problems of the prior art by providing a power steering apparatus whereby the vibration noise from the EPS motor is reduced, and there is a reduced degree of transfer of vibration from the EPS motor to the vehicle body, so that resultant driver discomfort is reduced and the effects of such vibration on the motion of the vehicle are suppressed. It is a further objective of the invention to reduce the degree to which vibration of the tires occurs.

To achieve the above objectives according to a first aspect, the invention provides a power steering apparatus for a vehicle, having a control section which produces a drive current in accordance with an amount of steering actuation applied by a driver of the vehicle and an electrical power steering motor that is driven by the drive current to adjust a steering angle of front wheels of the vehicle, with such a power steering apparatus being characterized in that the control section is configured with:

(a) means for detecting a specific condition of pulsation of the drive current due to vibration of rubber of tires which are mounted on the front wheels, in which the vibration is caused by lateral forces acting on the front wheels, and (b) means responsive to the detection of the specific condition of pulsation for supplying to the power steering motor a current which is free from the pulsation, as the drive current for the motor.

In that way, such vibration of the tire rubber is effectively suppressed, thereby preventing resultant vibration of the power steering motor and corresponding generation of audible noise, and preventing discomfort to the driver from being caused by transfer of vibration from the power steering motor to the body of the vehicle. In addition, such tire vibration is prevented from affecting the stability of motion of the vehicle.

According to another aspect of the invention, the control section detects the frequency of any pulsation (i.e., appearing as a superimposed ripple component) of the drive current, to determine whether such pulsation is being caused by occurrence of the aforementioned specific condition, i.e., due to lateral forces acting on the tires during adjustment of the steering angle. That is to say, if it is found that the frequency of such pulsation is close to a specific predetermined frequency which is indicative of that condition of vibration, then the control section judges that the specific condition is occurring.

According to another aspect of the invention, the control section detects the amplitude of such pulsation of the drive current of the power steering motor. When it is judged that the amplitude exceeds a predetermined value, then the control section effects removal of the pulsation from the drive current. Preferably, this is executed only if it has been judged that the frequency of the pulsation is close to the aforementioned specific predetermined frequency (i.e., is within a predetermined range of frequencies centered on that predetermined frequency). In that case, it can be ensured that operations to effect removal of the pulsation is performed only when such pulsation is being caused by the aforementioned specific condition, i.e., due to lateral forces acting on the tires during adjustment of the steering angle.

According to another aspect of the invention, the control section detects the phase of such pulsation of the power steering motor drive current, and when is judged as described above that the pulsation is being caused by the aforementioned specific condition, i.e., due to lateral forces acting on the tires during adjustment of the steering angle, then the control section adds to the drive current a periodically varying current that is of inverse phase to the aforementioned pulsation of the drive current, such as to cancel and thereby suppress the pulsation.

According to another aspect of the invention, when the control section begins to detect the start of occurrence of such pulsation of the power steering motor drive current, a supplementary value of drive current is determined in accordance with the rate of change of the drive current immediately before the start of occurrence of the pulsation. During an immediately subsequent masking interval, the level of drive current which is actually supplied to the power steering motor is determined by combining the supplementary value with the value of drive current that is necessary to provide a required amount of torque assistance to the steering mechanism. The actual level of drive current supplied to the power steering motor can thereby be established such as to effectively suppress occurrence of the pulsation, during the masking interval.

DESCRIPTION OF PREFERRED EMBODIMENTS

First Embodiment

Figure 1:
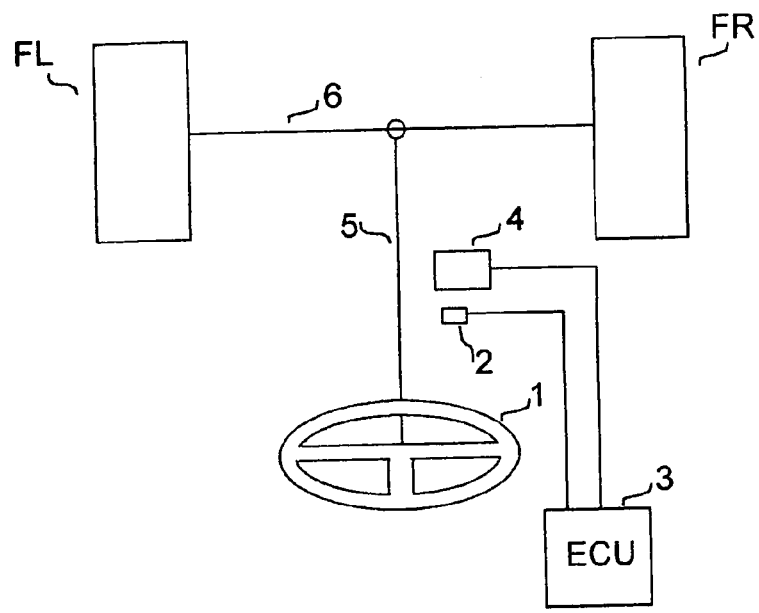
FIG. 1 is a conceptual diagram of the overall configuration of an embodiment of a power steering apparatus according to the present invention.

FIG. 1 is a conceptual diagram of an embodiment of a power steering apparatus according to the present invention. The configuration and operation of this apparatus will be described in the following.

As shown in FIG. 1, this power steering apparatus is made up of a steering wheel 1, a steering sensor 2, a steering ECU 3, an EPS motor 4, a steering shaft 5, a tie rod 6 and two front wheels FL, FR.

The steering wheel 1 is actuated by the vehicle driver in accordance with his intentions for driving the vehicle, and the steering sensor 2 detects an amount of actuation of the steering wheel 1 by the vehicle driver.

The steering ECU 3 constitutes a control section of this embodiment, which receives a detection signal that is produced by the steering sensor 2 (e.g., indicative of the amount of turning force being applied to the steering wheel 1 by the driver) and produces a drive current which is supplied to drive the EPS motor 4, with the level of that drive current being determined in accordance with the detection signal from the steering sensor 2. The steering shaft 5 is connected to the tie rod 6 via a linkage mechanism, and the EPS motor 4 is coupled to that linkage mechanism such as to move both of the front wheels FL, FR in a common direction.

With a power steering apparatus having such a configuration, when the vehicle driver actuates the steering wheel 1, the degree of actuation that is thereby applied is detected by the steering sensor 2, and the resultant detection signal that is produced from the steering sensor 2 is supplied to the steering ECU 3. The steering ECU 3 thereby produces a drive current in accordance with the level of actuation of the steering wheel 1, which is supplied to the EPS motor 4. The EPS motor 4 is thereby driven such that the tie rod 6 urges the front wheels FL, FR in a direction that is in accordance with the angular direction in which the steering wheel 1 is turned. The degree of force applied to the steering wheel 1 by the vehicle driver is thereby multiplied, i.e., "torque assist" is applied to the steering mechanism in accordance with the degree to which the vehicle driver is actuating the steering wheel 1.

The processing performed with such a power steering apparatus will be described in the following, referring to the flow diagrams of FIGS. 2, 3.

Figure 2:
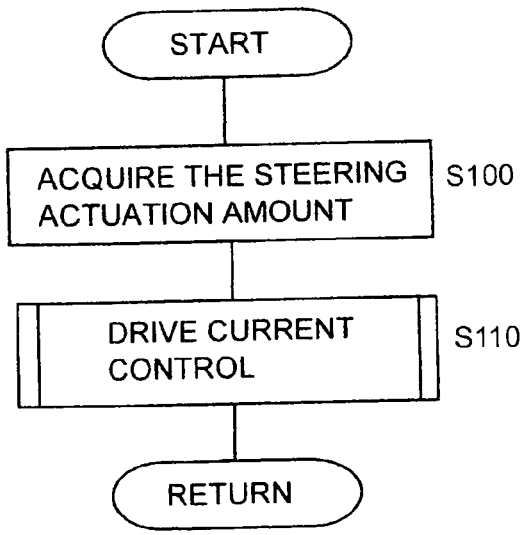
FIG. 2 is a flow diagram of a main processing routine which is executed with the embodiment of FIG. 1.

FIG. 2 shows a main processing routine, which is repetitively performed by the steering ECU 3 of this embodiment, after the ignition switch of the vehicle has been turned on.

Firstly in step S100, the degree of actuation (e.g., measured as an amount of torque) that is being applied by the vehicle driver is acquired based on the detection signal from the steering sensor 2. Next, in a processing subroutine designated as step S110, drive current control is applied to the EPS motor 4 based on the steering actuation amount which has been acquired.

Figure 3:
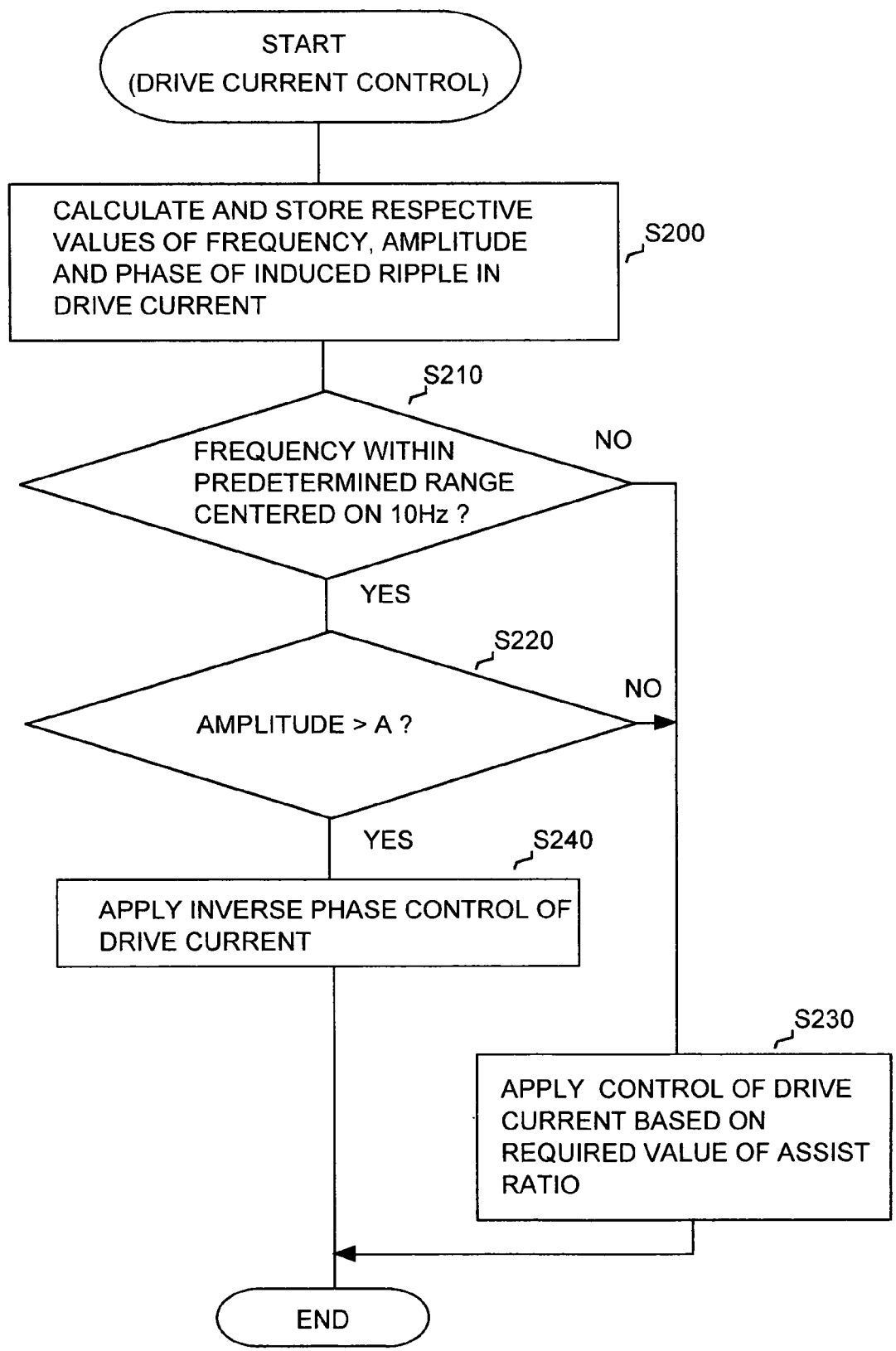
FIG. 3 is a flow diagram of EPS motor drive current control processing in the routine of FIG. 2.

FIG. 3 is a flow diagram of the drive current processing of S110 of FIG. 2. Firstly in step S200, the frequency and phase of a ripple component of the drive current are measured. Next in step S210 a decision is made as to whether or not the frequency of that ripple component is within a predetermined range of frequencies that is centered on 10 Hz. This judgement is performed in order to determine whether fluctuations in the motor drive current are being caused by vibration of the rubber of the tires, caused by lateral forces acting on the tires. Since such vibration of the tire rubber has a frequency of approximately 10 Hz, the occurrence of such vibration can be reliably detected by judging whether or not the frequency of a ripple component of the motor drive current (i.e., caused by vibration of the motor shaft) is approximately 10 Hz.

If a YES decision is made in step S210, then since this indicates that fluctuation (i.e., ripple) of the drive current of the EPS motor 4 is occurring due to vibration of the tire rubber caused by lateral forces on the tires, operation proceeds to step S220. Conversely if a NO decision is made in step S210, then since this indicates that the ripple component in the motor drive current is not caused by vibration due to such lateral forces acting on the tire rubber, operation proceeds to step S230, in which a level of drive current is supplied to the EPS motor 4 that is determined in accordance with the steering actuation amount that has been acquired in step S100 of FIG. 2. Processing then ends.

In step S220, a decision is made as to whether the amplitude of the ripple component in the drive current of the EPS motor 4 exceeds a predetermined value, designated as the value A. As described above, vibration of the tires caused by lateral forces acting on them is transmitted to the power steering apparatus, thereby affecting the output power of the EPS motor 4, and producing pulsation in the drive current which flows in the EPS motor 4. In step S220 the amplitude of the pulsation in the drive current is compared with the predetermined amplitude value A. That amplitude value A is established based upon factors such as the rigidity of the shaft of the EPS motor 4 and the level of motor drive power, and so must be established in accordance with the characteristics of each particular vehicle model.

If it is found that the amplitude of the pulsation of the drive current exceeds the predetermined value A, i.e., a YES decision is made in step S220, then this indicates that vibration of the tire rubber is being transmitted through the steering mechanism to the EPS motor 4, causing the pulsation in the drive current, and so operation proceeds to step S240. If there is a NO decision made in step S220, then operation proceeds to step S230 described above.

In step S240, inverse phase current control is applied, whereby a current which is of equal frequency and amplitude to the ripple (i.e., pulsation) of the drive current of the EPS motor 4 and is of opposite phase to the ripple is added to the motor drive current. This processing is performed based on the values for frequency, phase and amplitude that have been obtained for the ripple component in the drive current in step S200 as described above.

Figure 4A:
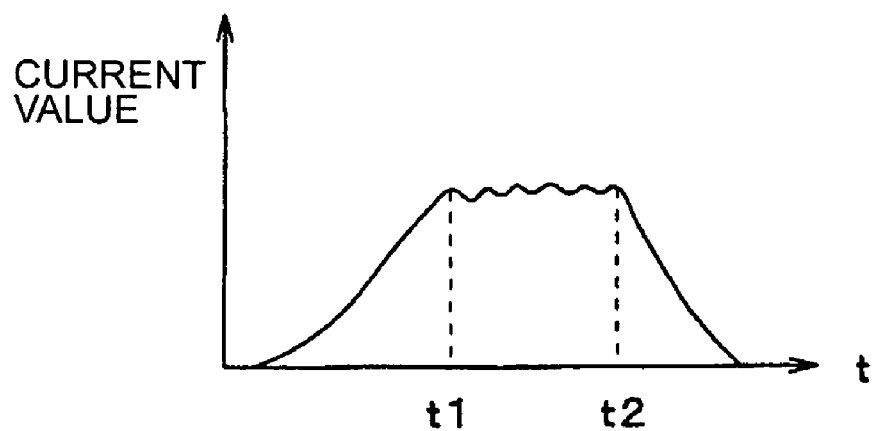
FIG. 4A is a waveform diagram of EPS motor drive current which flows when drive current control is not executed.

FIG. 4A is a simplified diagram of an example of the variation with respect to time of the drive current of the EPS motor 4 when vibration of the tire rubber occurs due to the action of lateral forces acting on the tires as described above. Here, the vibration occurs in an interval between time points designated as t1, t2. In such a case, with drive current control applied as described above referring to FIG. 3, then if for example the onset of the vibration is detected immediately after time point t1 in the example of FIG. 4A, (i.e., there is a YES decision reached in step S220, in an execution of the processing routine of FIG. 3 at that time), inverse phase current control is applied until a time point (corresponding to the time point t2) at which no lateral vibration of the tires will occur (e.g., a point at which the steering ECU 3 determines that no further torque assistance is to be applied by the steering motor 4).

Figure 4B:
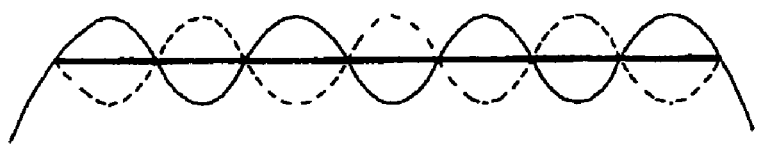
FIG. 4B is waveform diagram showing the motor drive current when drive current control is applied.

As a result, the pulsation (ripple) in the drive current of the EPS motor 4 is effectively damped, so that the variation of that drive current that is actually supplied to the EPS motor 4 during the interval from t1 to t2 becomes substantially as indicated by the heavy full-line portion of the diagram of FIG. 4B.

Hence with this embodiment of a power steering apparatus, when pulsation occurs in the drive current of the EPS motor 4 due to vibration of the tire rubber caused by lateral forces acting on the vehicle tires, the pulsation is effectively cancelled, by adding to the drive current of the EPS motor 4 a current that is of equal frequency but opposite phase to the pulsation. Thus, the twisting vibration of the tire rubber is suppressed, while in addition the effects of such twisting vibration are eliminated.

In addition, vibration of the shaft of the EPS motor is suppressed, so that transfer of such vibration from the EPS motor to the body of the vehicle is eliminated, and the driver discomfort which can be caused by such vibration of the vehicle body is thereby eliminated. Moreover, greater stability of the vehicle motion can be achieved.

Second Embodiment

With the above embodiment, inverse phase current control is applied in step 240 of FIG. 3 as described above. However as an alternative, it would be possible to apply a form of masking processing to achieve a similar effect. The term "masking processing" as used here refers to a technique of selecting an interval during which drive current is being supplied to the EPS motor 4 (specifically, an interval in which the aforementioned pulsation will occur unless they are suppressed) and, during that masking interval, determining the level of drive current such as to ensure that the pulsation will be suppressed, rather than determining the level of drive current only in accordance with the required amount of supplementary torque that is to be applied to the steering mechanism.

Specifically, when it is judged that pulsation of the drive current has started to occur which satisfies the aforementioned conditions described for the first embodiment, then a masking interval begins (e.g., extending between the time points t1, t2 in the example of FIG. 4A). During that masking interval, a supplementary level of drive current for the EPS motor 4 is determined based on the rate of change of amplitude of the drive current which occurred immediately prior to the start of the pulsation (e.g., immediately before the time point t1 in the example of FIG. 4A). The value of rate of change can for example be that which is obtained during an interval of fixed duration, immediately preceding the point at which pulsation of the drive current has started to occur which satisfies the aforementioned conditions.

The supplementary level of drive current is combined in a predetermined manner with the level of drive current that has been determined as necessary for producing the required level of torque assistance to thereby determine the actual level of drive current that is supplied to the EPS motor 4 during the masking interval. The supplementary level of drive current is predetermined such that the resultant actual level of drive current of the EPS motor 4 will effectively suppress the occurrence of the aforementioned drive current pulsation.

Figure 5:
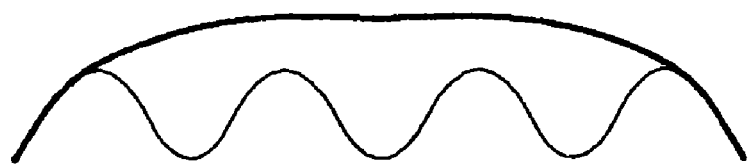
FIG. 5 is a waveform diagram for describing effects of a masking control of the EPS motor drive current which is applied with a second embodiment.

In that way, the drive current of the EPS motor 4 is thereafter controlled to a suitable level to suppress the drive current pulsation, until the time point t2. As a result, the variation of the drive current during the interval from t1 to t2 becomes as illustrated by the thick-line portion of FIG. 5, with the drive current pulsation being effectively eliminated.

Figure 6:
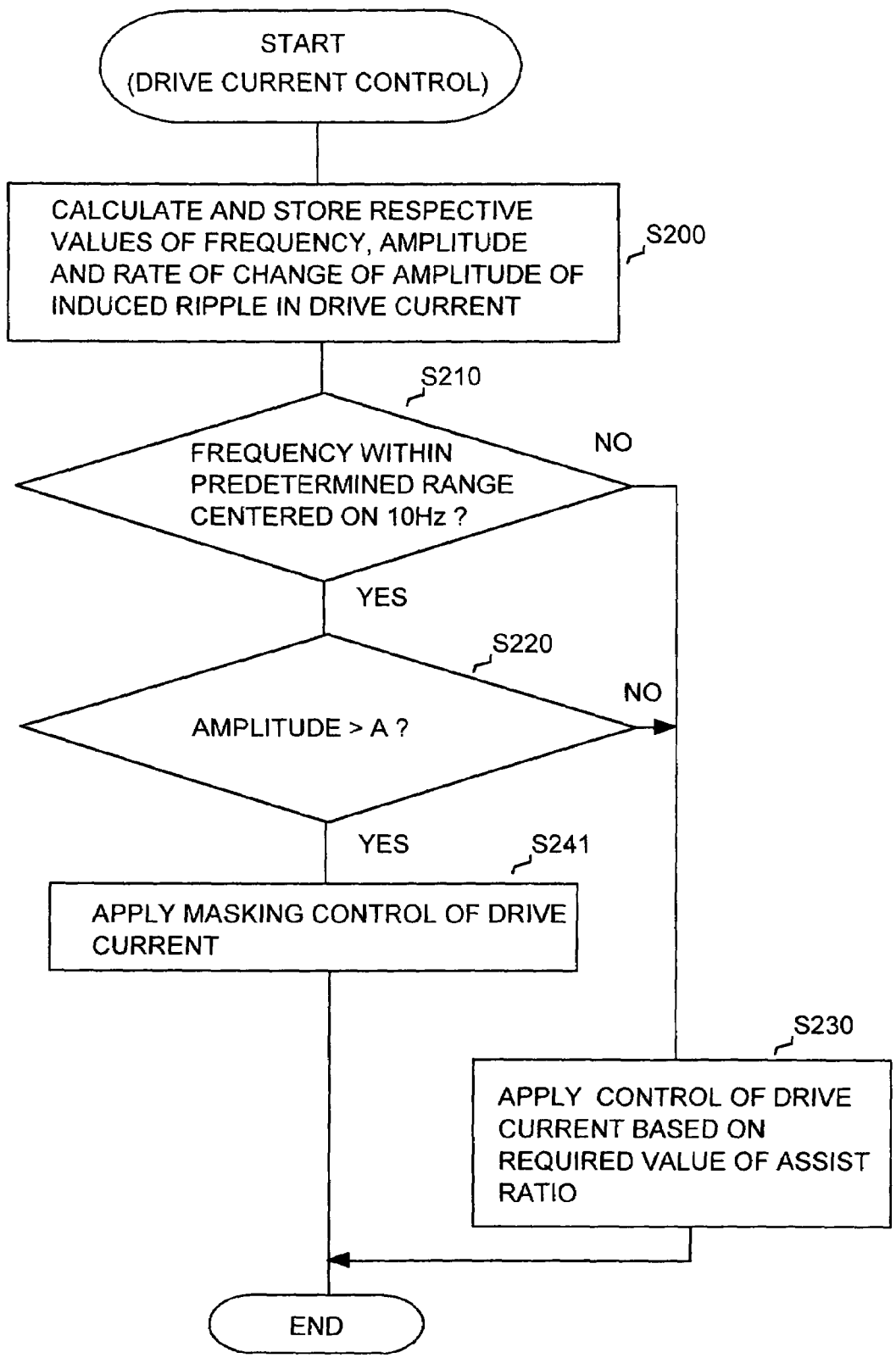
FIG. 6 is a flow diagram of EPS motor drive current control processing that is applied with the second embodiment.

The drive current control processing of this embodiment is illustrated in the flow diagram of FIG. 6, in which processing steps corresponding to those of FIG. 3 of the first embodiment are indicated by identical designations to those of FIG. 3. As shown, the processing differs from that of FIG. 3 in that the drive current masking control described above is executed in step S241, in accordance with the rate of change of the motor drive current immediately prior to the start of occurrence of drive current pulsation (the latter being detected as YES decisions in each of the steps S210, S220, as described for the first embodiment).

Figure 7:
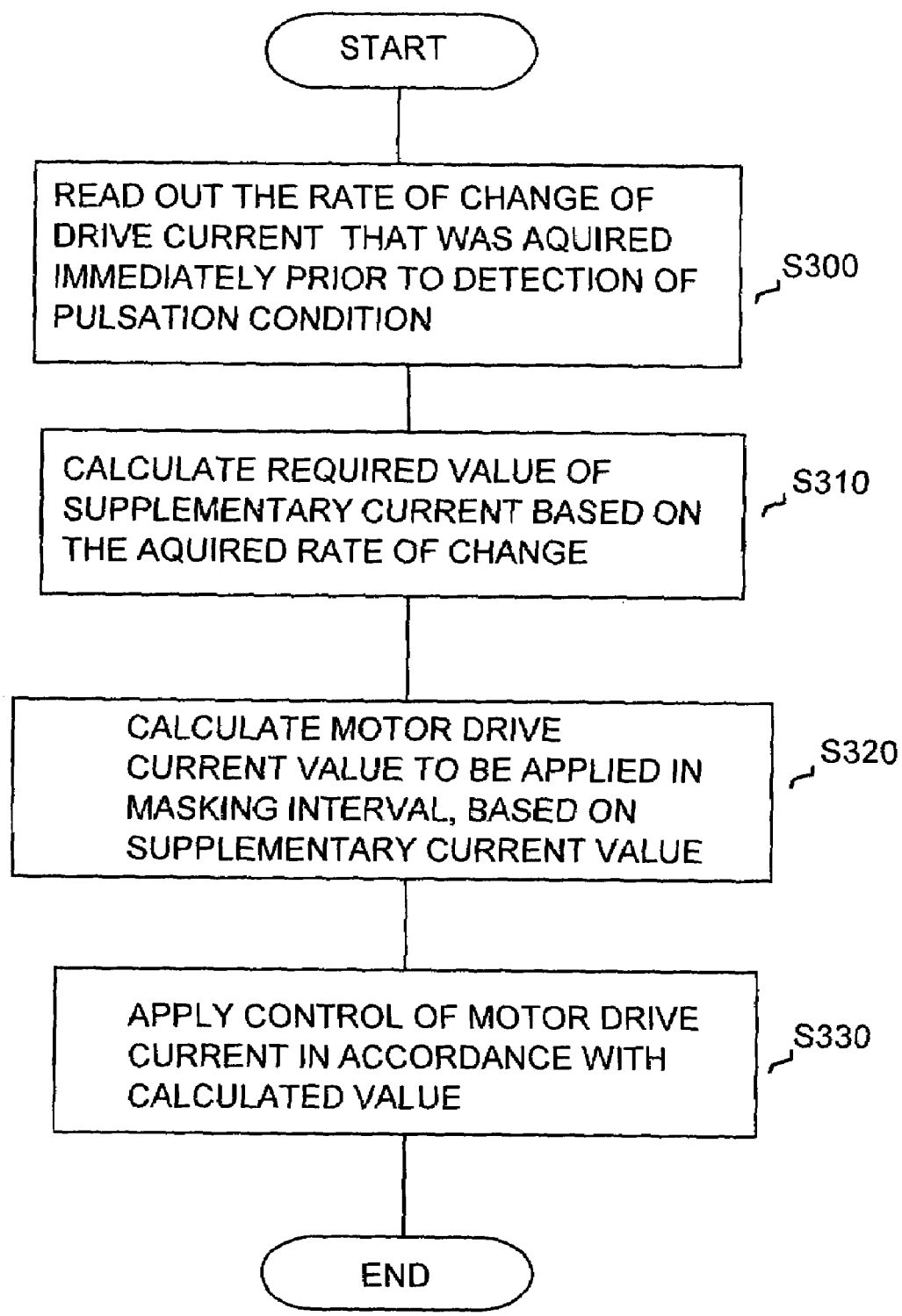
FIG. 7 is a flow diagram showing details of a masking control step in the flow diagram of FIG. 6.

The contents of step S241 in FIG. 6 are basically as illustrated in the flow diagram of FIG. 7. As shown, when a YES decision is reached in both of the steps S210, S220 of FIG. 6, then a value of rate of change of motor drive current that had been acquired and registered immediately previously is read out (step S300). That value is then used in calculating an appropriate value of supplementary current necessary for achieving suppression of the pulsation in the drive current (step S310). The actual level of drive current which is to be supplied to the EPS motor 4 is then calculated (step S320) based on that supplementary current value in combination with the drive current value most recently established in step S230 of FIG. 6. The motor drive current is then controlled to be in accordance with that calculated value (step S330).

It can thus be understood that this embodiment can achieve similar effects to those of the first embodiment, by suppressing the effects of vibration of the vehicle tires caused by the action of lateral forces on the tires and hence on the EPS motor, thereby eliminating a cause of driver discomfort due to vibration of the vehicle body, and achieving improved stability of vehicle motion.

What is claimed is:

1. A power steering apparatus for a vehicle, having a control section which produces a drive current having a value determined in accordance with an amount of steering actuation that applied by a driver of said vehicle, and an electrical power steering motor that is driven by said drive current to adjust a steering angle of front wheels of said vehicle;

wherein said control section comprises:

means for detecting a specific condition of puma ion of said drive current due to vibration of rubber of tires which are mounted on said front wheels, said vibration being caused by lateral forces acting on said front wheel, and means responsive to said detection of said specific condition of pulsation for supplying to said power steering motor a current which is free from said pulsation, as said drive current.

2. A power steering apparatus according to claim 1, wherein said control section comprises means for detecting said specific condition of pulsation based on judgement of occurrence of a frequency component of said drive current that is substantially close to a predetermined frequency, said predetermined frequency having been selected as a frequency corresponding to said specific condition.

3. A power steering apparatus according to claim 2, wherein said control section comprises means for:

measuring a value of phase of pulsation of said drive current, and when said specific condition of pulsation is detected, effecting removal of said pulsation by adding to said drive current a current which varies periodically at said frequency of said pulsation and is of opposite phase to said pulsation.

4. A power steering apparatus according to claim 3, wherein said control section comprises means for:

judging an amplitude of said pulsation when said specific condition of pulsation is detected, and when said amplitude exceeds a predetermined value, effecting removal of said pulsation from said drive current.

5. A power steering apparatus according to claim 4, wherein said control section comprises means for:

measuring a value of phase of pulsation of said drive current, and when said specific condition of pulsation is detected and said amplitude exceeds said predetermined value, effecting said removal of said pulsation on by adding to said drive current a current which varies periodically at said frequency of said pulsation and is of opposite phase to said pulsation.

6. A power steering apparatus according to claim 4, wherein said control section comprises means for:

measuring successive values of rate of change of said drive current, when said specific condition of pulsation is detected, determining a supplementary current value based upon a value of rate of change of drive current obtained immediately prior to said detection of to specific condition, and during a masking interval which begins subsequent to said detection, determining an actual value of drive current that is supplied to said electrical power steering motor, said actual value being based upon said supplementary current value and upon said drive current value that is determined in accordance with said amount of steering actuation, in combination.

7. A power steering apparatus according to claim 2, wherein said control section comprises means for:

measuring successive values of rate of change of said drive current, when said specific condition of pulsation is detected, determining a supplementary current value based upon a value of rate of change of drive current obtained immediately prior to said detection of the specific condition, and during a masking interval which begins subsequent to said detection, determining an actual value of drive current that is supplied to said electrical power steering motor, said actual value being based upon said supplementary current value and upon said drive current value that is determined in accordance with said amount of steering actuation, in combination.

* * * * *